United States Patent Office 3,642,747
Patented Feb. 15, 1972

3,642,747
PRODUCTION OF ETHYLENE HOMOPOLYMERS OR COPOLYMERS WITH 2-HYDROPEROXY-2-ISO-PROPYLPHENYLPROPANE
Hans Gropper and Franz Georg Mietzner, Ludwigshafen (Rhine), and Friedrich Urban, Limburgerhof, Germany, assignors to Badische Anilin- & Soda-Fabrik Aktiengesellschaft, Ludwigshafen (Rhine), Germany
No Drawing. Filed Aug. 27, 1969, Ser. No. 853,493
Claims priority, application Germany, Sept. 6, 1968, P 17 95 294.2
Int. Cl. C08f 3/04, 1/60
U.S. Cl. 260—88.2 B                                    9 Claims

ABSTRACT OF THE DISCLOSURE

Production of ethylene homopolymers or copolymers by polymerization of ethylene or of mixtures of major amounts of ethylene and minor amounts of other monomers at superatmospheric pressure and elevated temperature using a polymerization initiator. It is characteristic of the process according to the invention that a 2-hydroperoxy-2-isopropylphenylpropane is used as polymerization initiator.

---

The present invention relates to a process for the production of homopolymers or copolymers of ethylene by polymerization of ethylene or of mixtures of major amounts of ethylene and minor amounts of other monomers at pressures of 1000 to 7000 atmospheres and temperatures of 100° to 400° C. using hydroperoxides as polymerization initiators with or without polymerization regulators.

Methods of this type are known in many variants, particularly as regards the chemical nature of the hydroperoxides used. It is known that the hydroperoxides used hitherto have advantages in one respect or another over other comparable initiators, but they also have disadvantages, whether it be that the polymerization proceeds too violently and is therefore difficult to control, or that unsatisfactory space-time yields are obtained, or that the polymers formed have undesirably high molecular weights, or that the polymers are not transparent, or that the polymers have an unpleasant odor.

The object of the present invention is to provide a process of the type defined above which does not have the said disadvantages of all or only has them to a very slight extent.

We have found that this object can be achieved by using a special hydroperoxide which has hitherto not been used.

Accordingly, the present invention relates to a process for the production of homopolymers or copolymers of ethylene by polymerization of ethylene or of mixtures of major amounts of ethylene and minor amounts of other monomers at pressures of from 1000 to 7000 atmospheres and temperatures of from 100° to 400° C. using a hydroperoxide as polymerization initiator with or without polymerization regulators, the hydroperoxide used being a 2-hydroperoxy-2-isopropylphenylpropane.

In particular the process according to the invention is distinguished from prior art comparable processes in that it is easy to control, it gives high space-time yields, it enables polymers having fairly low molecular weights to be produced and it yields highly transparent polymers which are practically odorless.

The process may be carried out by conventional methods in conventional equipment. It has proved to be particularly suitable to carry out the process continuously and to use tubular reactors such as are conventionally used for the high-pressure polymerization of ethylene (in this connection cf. "Ullmann's Encyklopädie der technischen Chemie," 3rd edition (1963), vol. 14, p. 139). Other reactors may however also be used, for example stirred autoclaves.

Ethylene homopolymers and copolymers can be prepared by the process. Conventional monomers are suitable for the copolymerization, for example vinyl esters, particularly vinyl esters of $C_2$ to $C_6$ alkanecarboxylic acids; esters of acrylic acid and methacrylic acid, particularly with $C_1$ to $C_8$ alkanols; ethylenically unsaturated carboxylic acids, particularly acrylic acid and methacrylic acid; and amides of ethylenically unsaturated carboxylic acids, particularly acrylamide and methacrylamide. The proportion by weight of these monomers should advantageously be not more than 40% by weight with reference to the total weight of the monomers to be polymerized.

The polymerization initiator to be used according to the invention, namely a 2-hydroperoxy-2-isopropylphenylpropane, i.e. a 2 - hydroperoxy-2-o-isopropylphenylpropane, a 2-hydroperoxy-2-m-isopropylphenylpropane, a 2-hydroperoxy-2-p-isopropylphenylpropane or a binary or ternary mixture of these isomers, is advantageouly used in an amount which is from 1 to 120, preferably from 2.5 to 12, mole p.p.m. with reference to the monomers to be polymerized. Furthermore, it is generally advantageous to use the initiator in the form of a solution (about 1 to 20% by weight) in an inert solvent such as benzene or isooctane.

The process according to the invention may be carried out, as is usual, in the presence of polymerization regulators. Examples of suitable regulators are hydrogen, ketones, alcohols and ethers (advantageously in amounts of from 0.1 to 5 mole percent with reference to the ethylene to be polymerized) and normal and branched hydrocarbons (advantageously in amounts of from 0.005 to 5 mole percent with reference to the ethylene to be polymerized).

The invention is illustrated by the following examples.

A tubular reactor such as is usually used in the continuous high-pressure polymerization of ethylene serves as the polymerization equipment in the following examples. The ratio of diameter to length of the reaction tube is 1:14,000. The reaction tube is surrounded by a jacket tube for a heat transfer medium. The jacket tube is subdivided into two zones which can be operated independently of each other, the first extending over two-fifths of the length of the tube (zone I) and the second over the remaining three-fifths of the length of tube (zone II). The end of the reaction tube is provided with a valve which is used (a) to regulate the pressure in the polymerization chamber and (b) to discharge the reaction product. Downstream of this valve are located a conventional high-pressure separator and a conventional low-pressure separator for separating the polymer obtained from nonpolymerized substances, i.e. mainly those amounts of monomers which have not been polymerized.

EXAMPLE 1

The reactor is charged per hour with a mixture (compressed to 2500 atmospheres) of (a) 1,000,000 parts by weight of ethylene, (b) 48 parts by weight (equivalent to 6.9 mole p.p.m.) of 2-hydroperoxy-2-p-isopropylphenylpropane (dissolved in isooctane; 2% by weight) and (c) 20,000 parts by weight of propane (as regulator). The heat transfer medium is kept at a constant temperature of 180° C. in zone I of the reactor jacket and at 200° C. in zone II; the reaction mixture thus reaches a mean reaction temperature of about 260° C. as a result of the heat of reaction which is liberated.

In this way 240,000 parts by weight of a polyethylene is obtained per hour which has a relatively low molecular weight and practically no odor, and which gives films having excellent clarity and gloss. Other physical data are: melt index (according to 150 TC 61 recommendation) =3.75; density (according to DIN 53,479/7.2)=0.9241 g./ccm.

EXAMPLE 2

The reactor is charged per hour with a mixture (compressed to 2100 atmospheres) of (a) 1,000,000 parts by weight of ethylene, (b) 33 parts by weight (equivalent to 4.8 mole p.p.m.) of 2-hydroperoxy-2-isopropylphenylpropane (consisting of 90% by weight of the p-isomer and 10% by weight of the m-isomer; dissolved in isooctane; 2% weight) and (c) 10,000 parts by weight of propane (as regulator). The heat transfer medium is kept at a constant temperature of 185° C. in zone I of the reactor jacket and at 205° C. in zone II; the reaction mixture thus reaches a mean reaction temperature of about 245° C. as a result of the heat of reaction which is liberated.

In this way 210,000 parts by weight of a polyethylene is obtained per hour which has a relatively low molecular weight and practically no odor, and which gives films having excellent clarity and gloss. Other physical data are: melt index (according to 150 TC 61 recommendation)=0.5; density (according to DIN 53,479/7.2)= 0.9191 g./ccm.

We claim:
1. In a process for the production of ethylene homopolymers or copolymers by polymerization of ethylene or mixtures of major amounts of ethylene and minor amounts of other monomers at pressures of from 1000 to 7000 atmospheres and temperatures of from 100° to 400° C. using a hydroperoxide as a polymerization initiator, the improvement which comprises carrying out said polymerization with 2-hydroperoxy-2-isopropylphenylpropane as said polymerization initiator.

2. A process as claimed in claim 1 wherein the polymerization initiator is 2-hydroperoxy-2-o-isopropylphenylpropane.

3. A process as claimed in claim 1 wherein the polymerization initiator is 2-hydroperoxy-2-m-isopropylphenylpropane.

4. A process as claimed in claim 1 wherein the polymerization initiator is 2-hydroperoxy-2-p-isopropylphenylpropane.

5. A process as claimed in claim 1 wherein the polymerization initiator is a mixture of two or three of the following: 2-hydroperoxy-2-o-isopropylphenylpropane, 2-hydroperoxy-2-m-isopropylphenylpropane and 2-hydroperoxy-2-p-isopropylphenylpropane.

6. A process as claimed in claim 1 wherein the polymerization initiator is used in an amount of from 1 to 120 mole p.p.m. with reference to the monomers to be polymerized.

7. A process as claimed in claim 6 wherein said amount of the polymerization initiator is from 2.5 to 12 mole p.p.m.

8. A process as claimed in claim 1 wherein the initiator is used in the form of a solution in an nert solvent.

9. A process as claimed in claim 1 wherein a 1 to 20% by weight solution of the initiator is used.

References Cited

UNITED STATES PATENTS 3,293,233  12/1968  Erchak, Jr. et al. ____ 260—94.9
3,334,081  8/1967   Madgwick et al. _____ 260—94.9

FOREIGN PATENTS 1,248,020  8/1967  Germany _____ 252—426

JOSEPH L. SCHOFER, Primary Examiner

A. HOLLER, Assistant Examiner

U.S. Cl. X.R.

260—94.9 R, 610 R

PO-1050
(5/69)

UNITED STATES PATENT OFFICE
CERTIFICATE OF CORRECTION

Patent No. 3,642,747      Dated February 15, 1972

Inventor(s) Hans Gropper, Franz Georg Mietzner, and Friedrich Urba

It is certified that error appears in the above-identified patent and that said Letters Patent are hereby corrected as shown below:

Column 4, line 20, claim 8, "nert" should read -- inert --.

Signed and sealed this 26th day of September 1972.

(SEAL)
Attest:

EDWARD M. FLETCHER, JR.           ROBERT GOTTSCHALK
Attesting Officer                  Commissioner of Patents